Oct. 18, 1949. H. M. WEIR 2,485,249
PROCESS AND APPARATUS FOR MANUFACTURING GELS
Filed Feb. 19, 1944 2 Sheets-Sheet 1

Inventor
HORACE M. WEIR

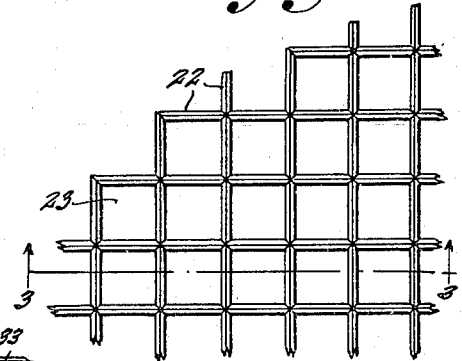
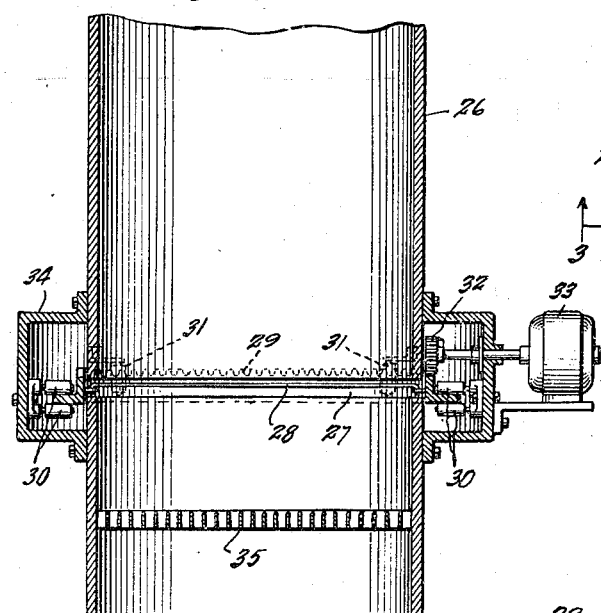
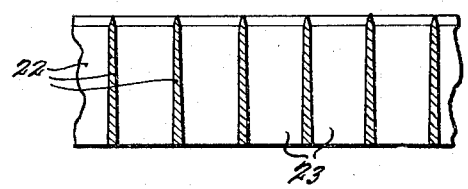
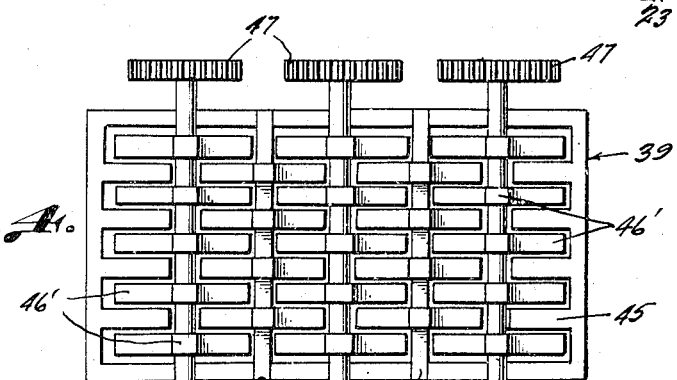
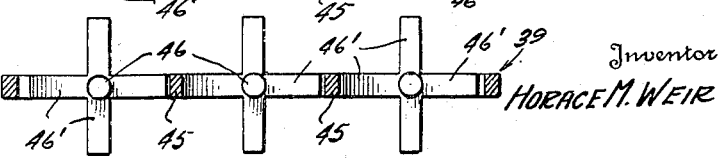

Patented Oct. 18, 1949

2,485,249

UNITED STATES PATENT OFFICE 2,485,249

PROCESS AND APPARATUS FOR
MANUFACTURING GELS

Horace M. Weir, Wynnewood, Pa., assignor to
The Davison Chemical Corporation, Baltimore,
Md.

Application February 19, 1944, Serial No. 523,163

3 Claims. (Cl. 23—182)

This invention relates to the manufacture of gels, and more especially to a process and apparatus suitable for the continuous manufacture of oxide gels.

Oxide gels, such as silica gel, can be made, for instance, by reacting solutions of an alkali metal silicate, such as sodium silicate, with an acid, such as sulphuric acid, to produce a hydrosol which upon setting will form a hydrogel. It is possible to effect the setting of the hydrosol to form a hydrogel either in batches or continuously. In the latter procedure the hydrosol may be passed through a setting zone, in which setting of the hydrosol to a hydrogel will take place during passage therethrough.

The present invention resides in the treatment and regulation of the gel-forming materials, the control of the gelling operation, treatment and handling of the hydrogel formed, washing of the gel, and control and handling of the gel during and after washing. In addition, the present invention embraces apparatus suitable for effecting the manipulations above mentioned.

An object of this invention is to control the flow of a hydrosol and a hydrogel resulting from the setting or gelling thereof through a setting or gelling zone.

A further object of this invention is to control the flow of a hydrosol and a hydrogel resulting from the setting or gelling thereof through a setting or gelling zone by regulating the admission of hydrosol or gel forming materials to the gelling zone.

It is also an object of this invention to restrict the discharge of the hydrogel from the gelling zone by extruding the same through tapered orifices.

An additional object of this invention is to extrude or discharge the hydrogel from the gelling zone directly beneath the surface of a wash liquid.

Another object of the present invention is to provide a process and apparatus for continuously forming and washing a hydrogel to produce a uniformly sized product under conditions which are controllable and can be held constant.

The present invention also has for an object a method and apparatus for the control, treatment and handling of hydrogel forming materials before, during, and after gelling and washing.

Still another object of the invention is to produce washed hydrogel with minimum labor costs.

With these and other objects in view which will appear more fully hereinafter, the present invention resides in the steps and procedures, and the parts and combinations described in the specification and illustrated in the accompanying drawings.

In practicing the invention, the selected ingredients, such as solutions of sodium silicate and sulfuric acid, are fed under pressure to a mixing zone where they are mixed to form a hydrosol. The hydrosol is forced under pressure to a setting or gelling zone and caused to travel through said zone while undergoing the process of setting or gelling. The hydrogel product from the zone is extruded through a sizing grid and subjected to means for cutting the extruded filaments in a direction at right angles to the direction of extrusion. The discrete particles of regular form are caused to move downward through a washing zone against a slowly rising flow of wash water. Gel particles which ultimately reach the lower portion of the washing zone are continuously removed therefrom or are removed intermittently at short intervals. The salt and acid-ladened wash water forced through the moving gel bed to the top thereof is continuously discarded at a point near the location where the gel particles enter the washing zone.

An important feature of the process resides in extruding the hydrogel from the setting or gelling chamber directly into and beneath the level of the wash water of the washing zone or into other suitable washing liquids. I thus obtain the cushioning effect of a liquid on the gel fragments and thus prevent the fragile sized hydrogel from being abraded or reduced by shock below the optimum size which has been imparted by the sizing mechanism.

In order to facilitate an understanding of the present invention, reference is made to the accompanying drawings, in which:

Figure 2 is a plan view of a modified form of extrusion grid.

Figure 3 is a sectional view taken on line 3—3 of Figure 2, and is an exaggerated showing of the taper of the grid plates.

Figure 4 is a plan view of a grate employed in the washing tank.

Figure 5 is a sectional view of the grate taken transversely of the movable shafts thereof.

Figure 6 is a sectional view of a setting or gelling tank embodying a modified form of the present invention.

Figure 1:
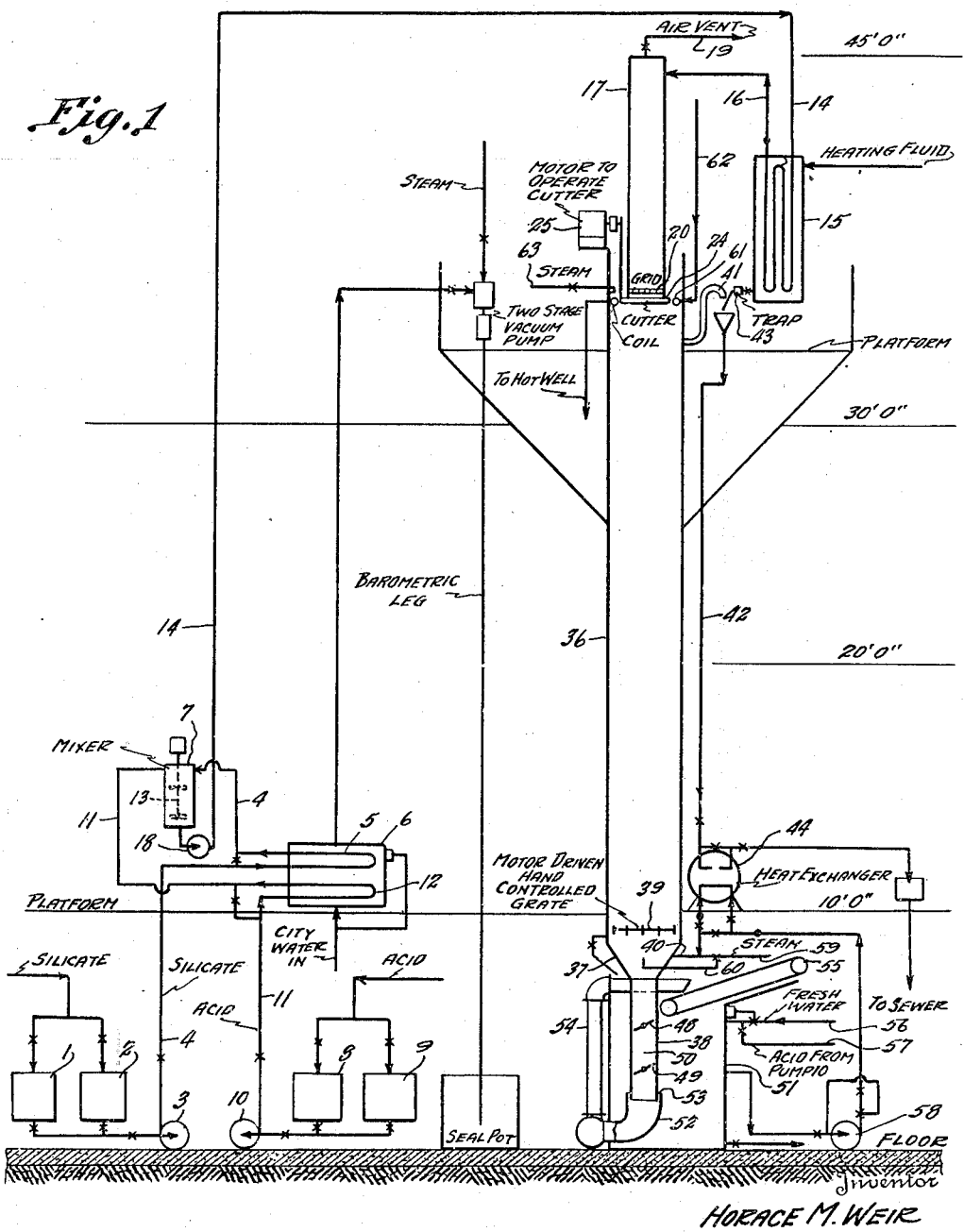
Figure 1 is a diagrammatic illustration of one form of apparatus which may be used to carry out the process in accordance with the present invention.

In the following description of the present invention reference is made to the preparation of silica gel from solutions of sodium silicate and sulphuric acid by way of example, but it should be understood that the process and apparatus may be adapted to the production of any oxide gel.

As illustrated diagrammatically in Figure 1 of the drawings, apparatus suitable for carrying out the present invention may comprise tanks 1 and 2 for the storage of aqueous solutions of sodium silicate of predetermined concentrations.

Tanks 1 and 2 are connected by means of suitable valve conduits with a source of sodium silicate which is fed to the tanks as required. The discharge outlets of the tanks 1 and 2 are connected by suitable valve conduits with the intake of a pump 3 which forces the silicate solution under pressure through a valved conduit 4 through a coil 5 of a heat exchanger 6 and thence into a mixer 7. Means are provided for the flow of the silicate solution through the conduit 4 so that the same may by-pass the coil 5 and the heat exchanger 6.

As illustrated in the drawings, the apparatus also includes storage tanks 8 and 9 in which may be stored suitable supplies of an aqueous sulphuric acid solution of desired concentration. As indicated, sulphuric acid solution may be supplied to the tanks through suitable valved inlets and withdrawn from the tanks through valved conduits connected with the intake of a pump 10. Sulphuric acid solution withdrawn from the tanks by the pump 10 is forced upwardly through the valved conduit 11 through a coil 12 in the heat exchanger 6 and thence to the mixer 7. As in the case of the coil 5, coil 12 may also be by-passed in the passage of the acid solution up through the conduit 11. The by-pass valves in the conduit 4 for the flow of the silicate solution and in the conduit 11 for the flow of the acid solution may be adjusted as desired to properly distribute the flow partially through the coils 5 and 12 and partially through the by-passes.

The heat exchanger 6 may be of any desired construction and may be equipped with means for heating or cooling the solutions passing through the coils 5 and 12. This heat exchanger may be of the evaporative type in which the temperatures of the solutions in the coils 5 and 12 are raised or lowered as desired. This unit may, if desired, be replaced by a heating or a combination heating and cooling unit of any selected type.

Pumps 3 and 10 may be of the metering type so that predetermined proportions of sodium silicate and acid solutions may be pumped to the mixer 7. As indicated, the mixer 7 is provided with an impeller 13 which is driven by an outside source of power, not indicated. The solutions introduced into the mixer 7 are thoroughly agitated so that intimate mixing is effected to produce a hydrosol.

As an example of a satisfactory operating procedure, the ratio of silicate solution to acid may be 1 part by weight of 25° Bé. aqueous sodium silicate solution to 1.05 parts by weight of 23° Bé. aqueous sulphuric acid solution. It is convenient, but not necessary, to use metering type pumps to maintain the above ratio of reagents or any other desired constant ratio. I may, however, choose to use flow controllers, or other instruments well known in the art and adapted to the maintenance of a specified ratio of reagents.

After mixing of the solutions, the resulting hydrosol may be forced by the combined pressure of the pumps 3 and 10 through a line 14 to a second heat exchange unit 15, thence through line 16 into the upper part of the setting or gelling chamber 17. Heat exchange unit 15 is of the type well known in the art in which a heating fluid is arranged to flow in heat exchange relationship with the material stream being processed.

In the heat exchanger 15 the hydrosol is brought to a temperature which is favorable to the setting or gelling action which takes place in the zone or chamber 17.

If desired, the flow of the hydrosol through conduit 14 to the gelling zone 17 may be effected by the pumps 3 and 10 or a third pump 18 may be provided in conduit 14 to effect and control the flow of the hydrosol. This pump 18 also may be of the metering type so that a predetermined quantity of hydrosol may be supplied to the gelling or setting zone 17 within a given time to control the flow of hydrosol and hydrogel through the zone. Other means of flow control (not shown) may be used in place of and in conjunction with pump 18.

The gelling or setting zone or chamber comprises a vertical tank having a closed upper end and an open lower end or base. A valve controlled vent 19 communicates with the closed upper portion of the chamber 17 for discharging air or other gas from the chamber 17 when the latter is initially filled with hydrosol at the beginning of the process operation. Thereafter the vent is maintained closed. The lower end of the tank 17 is provided with a grid 20 which serves to cut the hydrogel discharged from the lower end of the gelling or setting zone into elongated endless bodies.

Grid 20 acts as a cutter through which the set hydrogel is extruded as the result of the pressure exerted by the pumps 3, 10 and 18 and the force of gravity acting on the mass of hydrosol and hydrogel in the gelling zone 17. As shown, the grid 20 consists of a heavy wire screen or intersecting plates with rectangular mesh by means of which the gel is cut vertically into rectangular columns, but it may be of different construction.

In Figures 2 and 3, a modified form of grid 22 is shown in which the cross section of the openings 23 decrease downwardly. The taper of the grid segments may be of the order of 2%, and it will be appreciated that the taper of the plates depicted in Figure 3 is exaggerated. This type of grid serves to restrict the extrusion of the gel to prevent too rapid movement of the gel in the gelling zone. The openings 23 may obviously be other than rectangular.

Referring again to Figure 1, it will be noted that immediately below the grid 20 is a horizontal cutting means 24 driven by an actuator 25. The cutter actuator 25 may be driven or regulated by the flow of either or both the liquid reactants, either before or after admixture, towards the setting or gelling zone 17. The cutting means 24, which may be a single wire, is designed to pass at intervals through the mass of hydrogel being extruded through the grid 20, thereby cutting the rectangular shaped columns at right angles to the first division into portions of optimum size. If the rate of travel of the cutting means 24 is governed by the amount of solution entering the setting or gelling vessel 17, the hydrogel will be cut into portions of the same length irrespective of the time required to form the hydrogel in the setting chamber 17. Further reduction in the size of the brittle gel portions is prevented by conducting the cutting operations while the gel is immersed in water.

It is also within the concept of the present invention to effect cutting of the gel mass in the setting or gelling chamber 17 transversely thereof prior to extrusion through the grid. An apparatus embodying this feature of the invention is shown in Figure 6 in which the setting or gelling chamber is indicated by reference character 26. This chamber as indicated has a slot 27 in the wall thereof through which a cutting wire 28 is moved. Wire 28 is carried by an annular toothed member 29 supported between rollers 30 and guided by rollers 31. Toothed member 29 is rotated about the chamber 26 being driven through a pinion 32 by a motor 33. A housing 34 encases the toothed member 29 and associated mechanism and serves to join together the sections of the tank severed by the slot 27.

In operation, the downwardly moving mass of gel is severed into a helical body which on extrusion through the grid 35 is cut into small bodies, which are discharged through the bottom of the vessel 26.

It has been found that by tapering the setting or gelling chamber 17 or 26 inwardly, at least at its lower portion so that the tank has a taper of about 5%, any cracks which may form in the set hydrogel as the hydrogel moves downwardly through the tank are pushed together or closed. This prevents seepage of the hydrosol through the set hydrogel in the lower portion of the tank. It also retards in cooperation with the grid 21, the movement of the set gel.

In lieu of tapering the sides of the setting or gelling tank to decrease the cross section thereof at the lower portion, it is within the concept of this invention to employ a rod or other body positioned centrally within the tank, which rod or body increases in cross section toward the bottom of the tank, thus decreasing the effective cross section of the tank at the bottom thereof even though the tank is truly cylindrical.

It has been found advantageous to discharge the hydrogel into a liquid bath to avoid further reduction of size of the small bodies into which the gel is cut. Furthermore, as mentioned in connection with Figure 1, by cutting the hydrogel columns under liquid, there is less breakage of the small bodies. In view of the foregoing it is desirable to have the lower end of the gelling chamber 17 or 26 immersed in a liquid bath. As illustrated in Figure 1, the chamber 17 extends down into the open upper portion of a tank 36 which also serves as a means for washing the gel particles discharged therein to remove the water soluble reaction products such as sodium sulphate therefrom.

Wash tank 36 is provided with a tapered bottom 37 which terminates in a discharge conduit 38, and with a grate 39 upon which a bed of hydrogel collects.

A washing medium, such as plain or acidulated water, is introduced into the lower portion of the washer 36 through conduit 40 and flows upwardly through the bed of hydrogel formed in the washer. The washing medium escapes through an overflow goose neck 41 which is adjustable to vary the level of liquid in tank 36. From the goose neck 41 the water is discharged into a waste pipe 42 together with the discharge from trap 43 of the heater 15 and flows through the jacket of a heat exchanger 44 on the way to disposal. In normal operation the goose neck is adjusted to maintain the liquid level in tank 36 at a region above the grid 20.

As the hydrogel is extruded through grid 20 and cut by cutter 24, the small particles are suspended in the washing medium in tank 36 and settle downwardly through the up-flowing washing medium to form a bed of hydrogel on the grate 39.

As shown in Figures 4 and 5, the grate 39 is formed of a plurality of fixed grate bars 45 and a plurality of rotatable grate bars 46. The latter are provided with gears or sprockets 47 which are driven by actuating means (not shown). It will be noted that the rotatable bars 46 are provided with arms 46' extending radially thereof at 90° intervals.

Alternately, a series of hinged louvers may be employed. These louvers should be arranged in such a manner that the louvers when closed form a substantially continuous plane but when moved individually, in sequence, or simultaneously on the individual hinge arrangement provided for each member, form one or more slots or openings for the passage of the gel. Another equivalent may consist of a series of bars, elliptical or oval in cross section so that the longitudinal axis of each bar is horizontal and parallel to the axis of the adjoining bar. Each of these bars should be arranged to allow rotation about a longitudinal axis parallel to, but also eccentric with, its central longitudinal axis. Such a series of bars could be arranged to provide a substantially continuous plane for support of the gel bed and by rotation of the bars about individual axes provide slots for the passage of the gel downward. Other similar arrangements may be designed to perform these functions, as, for instance, a series of spaced grates.

In all of these arrangements, the grate will support the gel bed which will be in the neighborhood of 25 feet in depth, and then permit a selected portion of the bed to pass downward through the original plane of support. There is little or no agglomeration of the gel particles, and in this connection it is to be noted that the wash water exerts a buoying effect so that the mass does not tend to compact or become torn upon rotation of the grate. It is also to be noted that the successive rotation of the grates subjects the entire bed of a gel to a continuous, though limited, motion, which not only serves to prevent agglomeration but also insures a uniform discharge of the washed gel.

Moreover, the supporting grate may be eliminated and the gel bed supported by providing a cone or wedge-shaped base for the wash tank. Ordinarily, this is undesirable since such an arrangement tends to reduce the equal distribution of wash water through the gel bed and the positive and regular removal of the washed gel from the washer 36.

As indicated in Figure 1 of the drawings, conduit 38 is provided with a pair of gates 48 and 49. These gates are so fitted into the conduit 38 that when moved to a closed position they completely shut off the conduit to form a compartment or lock 50 intermediate the same. The lock provided in the conduit 38 by the pair of gates 48 and 49 serves to permit the discharge of the washed hydrogel from the wash tank 36 in small quantities without undue loss of the washing medium. As illustrated, the conduit 38 is submerged in a liquid contained in a well 51. The lower end of the conduit 38 discharges into an elbow 52, the inlet end of which is of larger diameter than the end of the discharge conduit 38 so as to provide a spacing 53 between the exterior wall of the conduit 38 and the interior wall of the elbow 52, thereby affording communication between the interior of the elbow 52 and the liquid within the well 51. This enables the liquid contained in the well 51 to flow into the elbow 52 after the gate 49 has been closed and enables the discharge of the gel from elbow 52 up through the worm drive conveyor 54 onto a conveyor belt 55 by means of which the washed hydrogel is conveyed to a region out of the liquid contained in the well 51.

After a portion of the divided gel has passed through the grate 39, it settles against the gate 48. This gate is periodically opened and admits the gel into the compartment 50. When this compartment is full, the gate 48 closes and the gate 49 opens. The gel is then drawn through the elbow 52 by the worm conveyor 54 and discharged upon the belt 55 by which it is transported for further treatment such as drying and activation. During this action, washing liquid is free to pass through the peripheral slot 53 of elbow 52. The gate 49 is then closed and the removal procedure repeated.

The liquid in the well 51 may be the same as that used for washing the gel in wash tank 36. In this instance, a washing medium, such as water, may be introduced through conduit 56 into the well 51 together with a supply of acid from conduit 57. Valves are provided to regulate the proportions of water and acid introduced into the well 51. From the well 51, the washing medium is withdrawn by pump 58 and passed through the heat exchange unit 44 where the temperature is raised by reason of the heat exchange relation existing between the same and the water passing through the waste conduit 42. From the heat exchanger 44 the washing medium is introduced through conduit 40 into the lower portion of the washer 36 beneath grate 39. If desired, the washing medium discharged by the pump 58 may be introduced directly into the lower portion of the washer 36 without passing through the heat exchanger 44. Steam may be introduced with the washing medium through the conduit 59, or, if desired, steam may be injected into the bottom of the washer 36 through the jet 60 which communicates with the steam pipe 59.

The interior surfaces of the chamber 17 and wash tank 36 are treated to withstand the action of sulphuric acid. In practice, the interior surfaces of the setting tank 17 can be sufficiently protected by the application of a layer of lead or tar or equivalent substance. A tar layer is preferable because it prevents the unset gel from wetting and sticking to the surfaces. It will be advantageous to have all the interior surfaces of the washer 36 made of a material which is resistant to dilute sulphuric acid, and the same applies to the well 51 and its associated apparatus, in the event a weak acid solution is used in the well.

When initiating the process, a layer of molten paraffin, or other material immiscible with water and easily congealed and melted, is provided on the surface of the wash liquid and the level is raised to approximately the upper surface of the grid 20. This layer then hardens and fills the interstices of the grid to support the hydrosol initially introduced into the setting tank 17. To effect and maintain solidification of the paraffin, a coil 61 is provided in the upper portion of the washer 36 adjacent the grid and is supplied with cold water through conduit 62. After the hydrosol sets to a gel to a substantial depth in the setting tank and is sufficient to support the body of unset hydrosol thereabove, the paraffin is melted by injection of steam through jet 63 or by passage of steam through the coil 61 previously used for cooling. Such molten paraffin in the base of setting tank 17 is forced out by the descending mass of gel, which latter is now free to be extruded through the grid 20. The wash water may then be adjusted to the normal level and the paraffin layer either left upon the body of wash water or removed and stored until the next time operations have to be initiated. If desired, a trough can be placed around the upper edge of the wash tank 36, and, to remove the paraffin, the level of the wash liquid may merely be raised until the molten paraffin overflows into said trough.

The gelling or setting tank 17 is of a sufficient length and the rate of discharge of the hydrogel from the lower portion of the setting tank is so controlled that the passage of the gel-forming material through the tank will require a time adequate for the setting of the hydrogel. The flow of the hydrogel through the gelling zone 17 is controlled by the hydraulic pressure on the supply of hydrosol to the upper portion of the gelling zone. Normally this pressure is sufficient to accelerate the movement of the gel through the zone, but in some instances the amount of hydrosol admitted to the top of the tank 17 may not be enough to compensate for the movement of the gel toward the discharge end under the action of gravity, and in this event a suction will be established in the top of tank 17 (vent 19 being closed). Therefore, a low pressure of the hydrosol may actually serve to retard the movement of the hydrogel. Consequently, the hydraulic pressure of the hydrosol can effect any desired rate of movement of the hydrogel through the zone.

By so controlling the rate of discharge and having the tank of the proper length, a body of set hydrogel will be formed a given distance from the bottom of the tank and will slide as a body down through the tank. This will serve to support the hydrosol in the upper portion of the setting tank.

Ordinarily, considerable time is required to effect proper washing of a hydrogel such as a silica hydrogel formed by the reaction of solutions of sulphuric acid and sodium silicate. In order to provide ample time for the washing of the gel bodies discharged from the lower end of the setting tank 17 into the washer 36, the washer is made of a sufficient depth and the rate of discharge of the washed gel from the lower portion thereof is so controlled that the gel will be subjected to the action of the washing medium for a predetermined required time.

It is believed apparent from the above description that a uniform and improved hydrogel can be produced by the process and apparatus of the present invention with a distinct saving of labor, time and materials. Although this invention has been described in connection with the production of a silica gel, the process and apparatus may be readily adapted to the production of any hydrogel by the employment of suitable temperatures and by effecting any necessary changes in the size and shape of the equipment.

I claim:

1. A process of forming a hydrogel within an elongated gelling zone having an upper inlet end and a lower outlet end having a grid associated therewith comprising forming a liquid-tight plug in the lower end of the gelling zone about said grid by cooling and solidifying molten paraffin, subsequently introducing gel-forming material into said zone and maintaining it there under the constraint of said liquid-tight plug to form a gel, melting the aforementioned plug, and removing the gel thus formed.

2. A process of forming a hydrogel within an elongated gelling zone having an upper inlet end and a lower outlet end having a grid associated therewith comprising depositing a layer of molten paraffin on the surface of a body of water, raising the surface of the body of water about the lower end of said gelling zone to raise the layer of paraffin up into the zone about said grid, cooling and solidifying the layer of paraffin to form a plug in the lower end of the gelling zone, subsequently introducing gel-forming material into said zone and maintaining it there under the constraint of said liquid-tight plug to form a gel, melting the aforementioned plug, and removing the gel thus formed.

3. Apparatus for gelling sols and for washing and producing a gel product comprising an elongated chamber, an inlet at the top thereof, an outlet at the bottom thereof, a second elongated chamber of greater cross sectional dimension surrounding said outlet, a washing liquid inlet near the bottom of said second elongated chamber, a washing liquid outlet near the top of said second elongated chamber, and a ventline having a valve therein communicating with the upper end of said first named chamber.

HORACE M. WEIR.

REFERENCES CITED

The following references are of record in the file of this patent:

UNITED STATES PATENTS

| Number | Name | Date |
|---|---|---|
| 838,658 | Silvera | Dec. 18, 1906 |
| 1,088,635 | Stevens | Feb. 24, 1914 |
| 1,393,383 | Linebarger | Oct. 11, 1921 |
| 1,438,048 | Marsh | Dec. 5, 1922 |
| 1,457,977 | Kitsee | June 5, 1923 |
| 1,612,167 | Beardsley et al. | Dec. 28, 1926 |
| 1,665,453 | Grunert | Apr. 10, 1928 |
| 1,884,618 | Downard | Oct. 25, 1932 |
| 2,006,586 | Downard | July 2, 1935 |
| 2,063,663 | Downard | Dec. 8, 1936 |
| 2,232,727 | Peterkin et al. | Feb. 25, 1941 |
| 2,284,435 | Lowe et al. | May 26, 1942 |
| 2,303,340 | Dreyfus | Dec. 1, 1942 |
| 2,323,583 | Wilson | July 6, 1943 |
| 2,326,523 | Connolly et al. | Aug. 10, 1943 |
| 2,336,734 | Jellinek | Dec. 14, 1943 |
| 2,358,202 | Behrman | Sept. 12, 1944 |
| 2,370,200 | Shadbaker | Feb. 27, 1945 |

FOREIGN PATENTS

| Number | Country | Date |
|---|---|---|
| 28,789 | Great Britain | 1913 |
| 553,736 | Great Britain | June 3, 1943 |